US012306598B2

(12) United States Patent
Kawai (10) Patent No.: US 12,306,598 B2
(45) Date of Patent: May 20, 2025

(54) INFORMATION PROCESSING APPARATUS (71) Applicant: NEC Corporation, Tokyo (JP)

(72) Inventor: Takazumi Kawai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1035 days.

(21) Appl. No.: 17/295,986

(22) PCT Filed: Nov. 27, 2018

(86) PCT No.: PCT/JP2018/043592
§ 371 (c)(1),
(2) Date: May 21, 2021

(87) PCT Pub. No.: WO2020/110201
PCT Pub. Date: Jun. 4, 2020

(65) Prior Publication Data
US 2022/0004154 A1 Jan. 6, 2022

(51) Int. Cl.
*G05B 13/04* (2006.01)
*G06N 5/04* (2023.01)

(52) U.S. Cl.
CPC ............ *G05B 13/048* (2013.01); *G06N 5/04* (2013.01)

(58) Field of Classification Search
CPC ...... G05B 13/048; G06F 17/17; G06N 20/00; G06N 5/04
See application file for complete search history.

(56) References Cited

U.S. PATENT DOCUMENTS

| 2013/0030561 | A1 | 1/2013 | Imanari | |
| 2014/0026085 | A1* | 1/2014 | Amminudin | G06F 3/04842 715/764 |
| 2019/0199589 | A1* | 6/2019 | Le | G06N 20/00 |
| 2019/0265679 | A1* | 8/2019 | Takayanagi | G06Q 10/20 |
| 2020/0314130 | A1 | 10/2020 | Nakai et al. | |

FOREIGN PATENT DOCUMENTS

| EP | 3336778 A1 * | 6/2018 | ............ G05B 13/04 |
| EP | 3499437 A1 * | 6/2019 | ........... G05B 19/418 |
| EP | 3608802 A1 * | 2/2020 | ............ G06N 20/00 |

(Continued)

OTHER PUBLICATIONS

Zhuang et al., "Method of network optimization and network optimization device", published on Nov. 12, 2019 but filed on May 2, 2013, Document ID: CN-105230063-B, pp. 33 (Year: 2013).*

(Continued)

*Primary Examiner* — Chau T Nguyen (57) ABSTRACT

An information processing apparatus according to the present invention includes: a prediction value calculation unit configured to, based on a model calculating an objective variable representing a state of a target by using a plurality of explanatory variables, for each of the explanatory variables, calculate a prediction value of the explanatory variable that changes based on a value of the explanatory variable at a predetermined moment; and a change quantity calculation unit configured to, for each of the explanatory variables, calculate a quantity of change of the objective variable with change of the explanatory variable by using the prediction value of the explanatory variable and the model.

16 Claims, 7 Drawing Sheets (56) References Cited

FOREIGN PATENT DOCUMENTS

| | | |
|---|---|---|
| JP | H10-133749 A | 5/1998 |
| JP | H11-203335 A | 7/1999 |
| JP | 2010-250599 A | 11/2010 |
| JP | 2011-135131 A | 7/2011 |
| JP | 2018-147280 A | 9/2018 |
| JP | 2018-151771 A | 9/2018 |
| WO | 2011/125221 A | 10/2011 |
| WO | WO-2014124609 A1 * 8/2014 ............. G06Q 10/06 |
| WO | WO-2016160734 A1 * 10/2016 ....... G06F 17/30371 |
| WO | 2018/134939 A1 | 7/2018 |

OTHER PUBLICATIONS

Akitoshi Isshiki, "Influence Factor Specifying Method", published on Nov. 4, 2006, Document ID: CN 102007510A, pp. 23 (Year: 2011).*

International Search Report for PCT Application No. PCT/JP2018/043592, mailed on Feb. 19, 2019.

* cited by examiner

$$d\zeta_x = \left.\frac{\partial f}{\partial x_1}\right|_{y_1} dx_1 + \left.\frac{\partial f}{\partial x_2}\right|_{y_2} dx_2 + \cdots \left.\frac{\partial f}{\partial x_n}\right|_{y_n} dx_n$$

$$= \sum_{k=1}^{n} \left.\frac{\partial f}{\partial x_k}\right|_{y_k} dx_k$$

INFORMATION PROCESSING APPARATUS

This application is a National Stage Entry of PCT/JP2018/043592 filed on Nov. 27, 2018, the contents of all of which are incorporated herein by reference, in their entirety.

TECHNICAL FIELD

The present invention relates to an information processing apparatus that assists in optimizing the state of a target, an information processing method, and a program.

BACKGROUND ART

In plants such as a manufacturing factory and a processing facility, the optimization of the state of a target such as the safety or environment of the plant or the quality of products is performed. For example, in order to optimize the safety, electric power, quality, manufacturing efficiency or the like in a plant, the optimal values of parameters such as the detection value of every kind of sensor and a raw material are calculated and regulated.

In general, the optimization of the state of a target as described above is performed by using a model in which the state of a target is set as an evaluation index called a KPI (Key Performance Indicator), the KPI is an objective variable, and every kind of parameter is an explanatory variable. That is to say, the optimal value of every kind of parameter is calculated using the model so that the optimal KPI is obtained. For example, in Patent Document 1, changes of parameters are simulated using the model, a parameter is selected and modified according to the result, and a future KPI is derived and evaluated.

Patent Document 1: Japanese Translation of PCT International Application Publication WO2018/134939
Patent Document 2: Japanese Unexamined Patent Application Publication JP-A 2011-135131

In general, however, a number of parameters are used in a model calculating a KPI for evaluating the state of a target, and it is difficult to select an appropriate parameter. For example, it is possible to optimize all the parameters by the method described above, but there is a fear that changing all the parameters affects the KPI. Moreover, some parameters cannot be changed depending on situations. Therefore, it is desirable to change minimal parameters to obtain the optimal KPI. In this case, especially in a large plant, the number of parameters may be 1000 or more, and therefore, it is required to narrow down the number of parameters to be selected. Moreover, since the relation between the parameters is complicated, it is still difficult to select an appropriate number of parameters. As a result, there arises a problem of difficulty in optimization of the state of a target. Furthermore, the abovementioned problem may arise not only in a case where a target to be optimized is a plant, but also in a case where the state of every kind of object is to be optimized, for example, a certain numerical value in health management of a living body is to be optimized.

SUMMARY

Accordingly, an object of the present invention is to solve the abovementioned problem that it is difficult to optimize the state of a target.

An information processing apparatus as an aspect of the present invention includes: a prediction value calculation unit configured to calculate, based on a model calculating an objective variable representing a state of a target by using a plurality of explanatory variables, for each of the explanatory variables, a prediction value of the explanatory variable that changes based on a value of the explanatory variable at a predetermined moment; and a change quantity calculation unit configured to calculate, for each of the explanatory variables, a quantity of change of the objective variable with change of the explanatory variable by using the prediction value of the explanatory variable and the model.

Further, a computer program as another aspect of the present invention includes instructions for causing an information processing apparatus to realize: a prediction value calculation unit configured to calculate, based on a model calculating an objective variable representing a state of a target by using a plurality of explanatory variables, for each of the explanatory variables, a prediction value of the explanatory variable that changes based on a value of the explanatory variable at a predetermined moment; and a change quantity calculation unit configured to calculate, for each of the explanatory variables, a quantity of change of the objective variable with change of the explanatory variable by using the prediction value of the explanatory variable and the model.

Further, an information processing method as another aspect of the present invention includes: calculating, based on a model calculating an objective variable representing a state of a target by using a plurality of explanatory variables, for each of the explanatory variables, a prediction value of the explanatory variable that changes based on a value of the explanatory variable at a predetermined moment; and calculating, for each of the explanatory variables, a quantity of change of the objective variable with change of the explanatory variable by using the prediction value of the explanatory variable and the model.

With the configurations as described above, the present invention makes it possible to easily optimize the state of a target.

EXAMPLE EMBODIMENTS

First Example Embodiment

Figure 4:
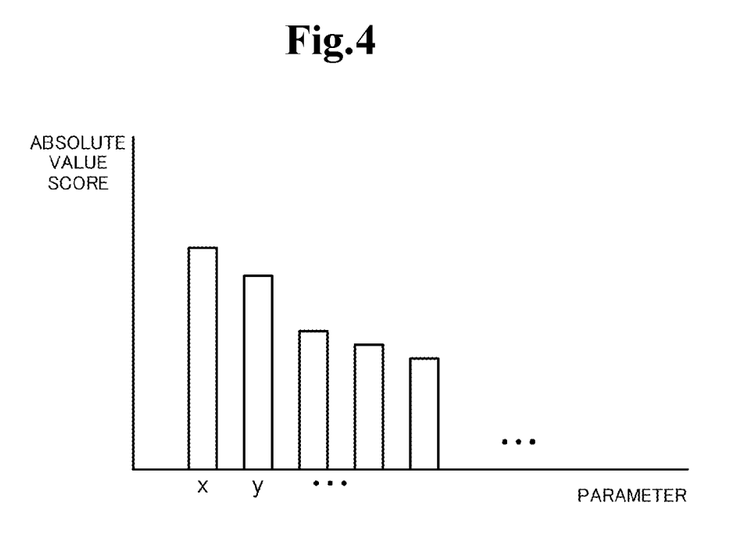
FIG. 4 is a view showing the ranking of change quantities of the KPI for each parameter calculated by the information processing apparatus disclosed in FIG. 1.
Figure 5:
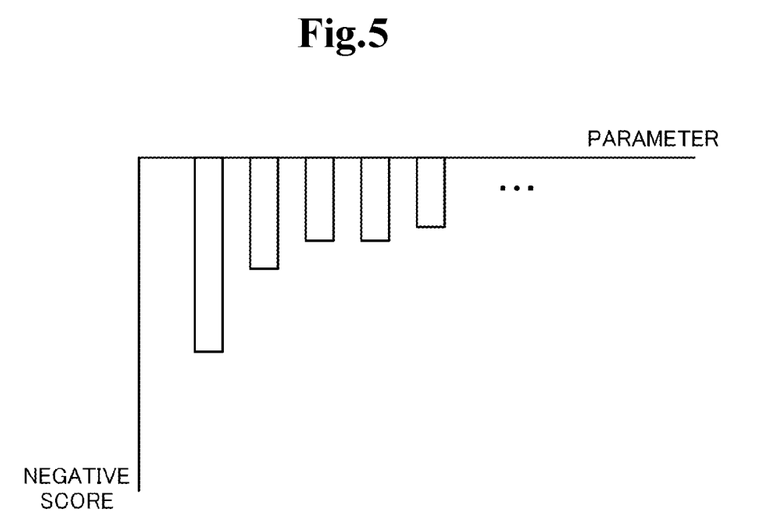
FIG. 5 is a view showing the ranking of change quantities of the KPI for each parameter calculated by the information processing apparatus disclosed in FIG. 1.
Figure 6:
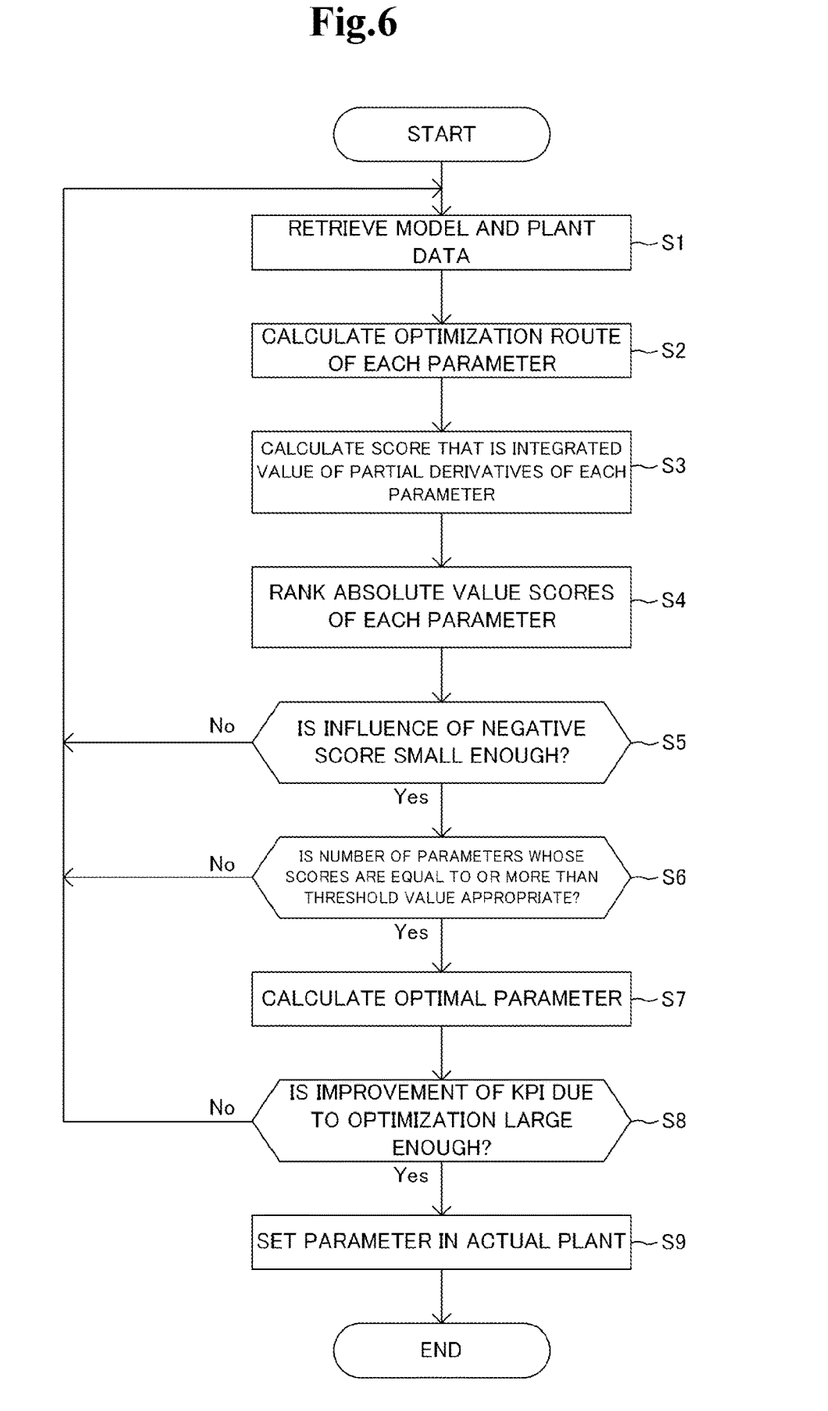
FIG. 6 is a flowchart showing an operation of the information processing apparatus disclosed in FIG. 1.

A first example embodiment of the present invention will be described with reference to FIGS. 1 to 6. FIGS. 1 to 5 are views for describing a configuration of an information processing apparatus, and FIG. 6 is a view for describing an operation of the information processing apparatus.

An information processing apparatus 10 according to the present invention is connected to a monitoring target 20 (a target) such as a plant and is used for optimizing the state of the monitoring target 20. The monitoring target 20 is, for example, a plant such as a manufacturing factory or a processing facility, and the state of the monitoring target 20 is the safety of the plant, an environmental state such as the quantity of exhaust gas, the quality of products, the manufacturing efficiency, or the like.

In this example embodiment, a case of setting, for example, a KPI (Key Performance Indicator) representing a safety evaluation index as the state of the monitoring target 20 and optimizing the KPI will be described as an example. The KPI is calculated by a model that is a preset calculation formula in which various detection values detected from the monitoring target 20 are parameters. That is to say, in the model, the KPI is an objective variable and various parameters are set as explanatory variables. The parameters are values which can be detected in the plant that is the monitoring target 20 and previously set information, and include a plurality of kinds of information, for example, the temperature, pressure and flow rate in the plant, the raw material name, composition and supply quantity of products manufactured in the plant, and so on.

However, the monitoring target 20 optimized in the present invention is not necessarily limited to a plant, and may be any target. At this time, the monitoring target 20 is not necessarily limited to an object. For example, the present invention may be applied to optimization of the biological information of a living body by setting the living information as a KPI (an objective variable) and the dietary condition of the living body as a parameter (a parameter). The biological information may be any information related to a living body, for example, the blood pressure, body temperature, heart rate, information related to blood such as blood glucose level and blood oxygen concentration, electrocardiogram waveform and electroencephalogram of a living body. The parameter may also be any information related to a living body.

Figure 1:
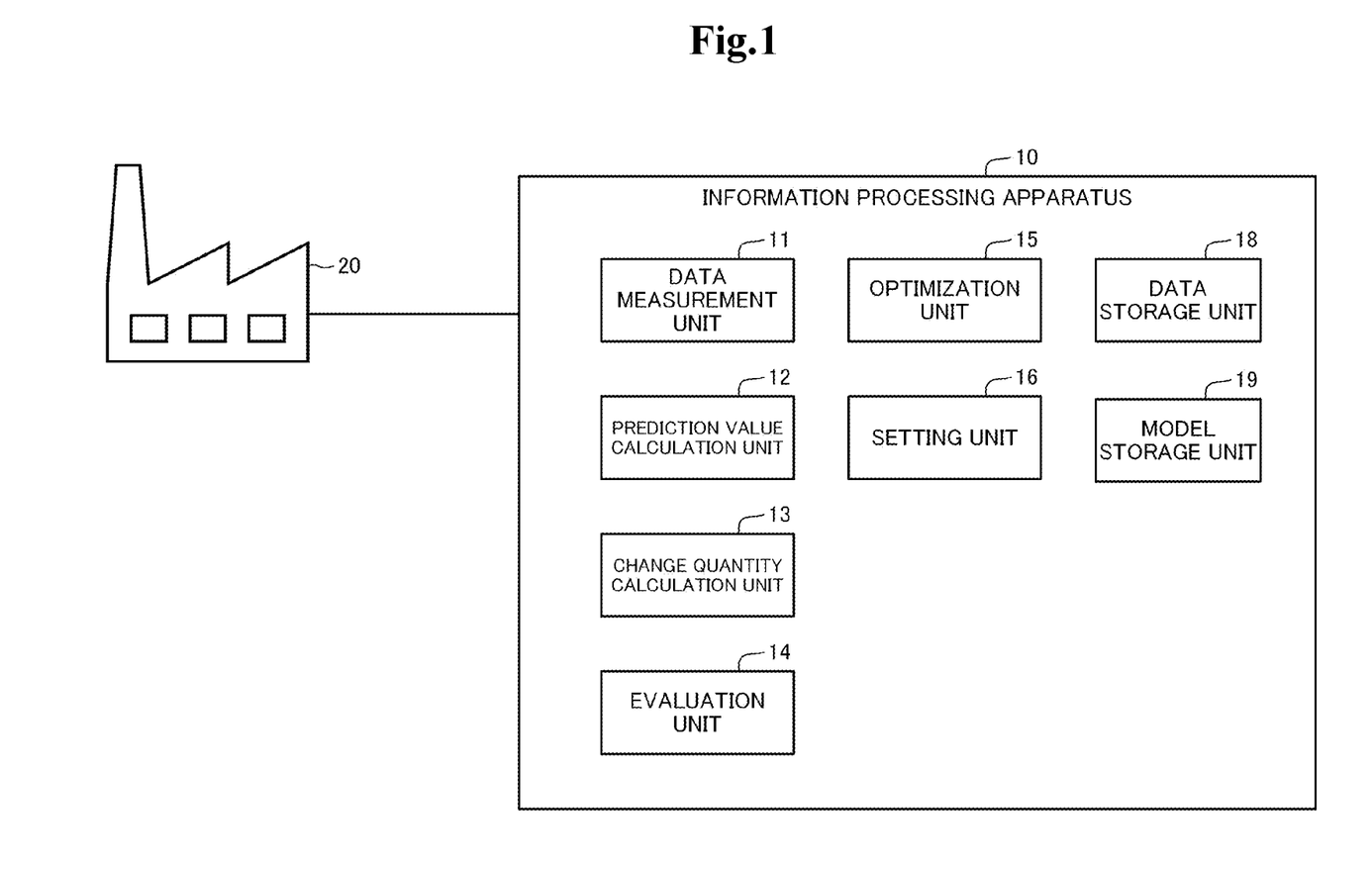
FIG. 1 is a block diagram showing a configuration of an information processing apparatus in a first example embodiment of the present invention.

The information processing apparatus 10 is composed of one or a plurality of information processing apparatuses each including an arithmetic logic unit and a memory unit. The information processing apparatus 10 includes, as shown in FIG. 1, a data measurement unit 11, a prediction value calculation unit 12, a change quantity calculation unit 13, an evaluation unit 14, an optimization unit 15 and a setting unit 16 that are structured by execution of a program by the arithmetic logic unit. Moreover, the information processing apparatus 10 includes a data storage unit 18 and a model storage unit 19 formed in the memory unit. Below, the respective components will be described in detail.

In the model storage unit 19, a model that is a calculation formula for calculating the KIP of the monitoring target 20 described above by using the parameter is stored. At this time, the number of parameters may be, for example, 1000 or more, but this example embodiment illustrates a case of using only two parameters x and y as will be described later.

The data measurement unit 11 acquires plant data including data measured by various sensors installed in the monitoring target 20 and data set for the monitoring target 20, and stores the plant data into the data storage unit 18. At this time, the data measurement unit 11 stores the plant data in association with information related to the date and time of acquisition of the plant data. The plant data is used as actual data of various parameters used in the abovementioned model. However, the data measurement unit 11 does not need to be provided necessarily, and the plant data may be stored in the data storage unit 18 in advance.

The prediction value calculation unit 12 calculates a prediction value representing a possible value of the parameter by using the model and actual data of the parameter at a predetermined moment. To be specific, the prediction value calculation unit 12 first retrieves the model stored in the model storage unit 19 and the plant data stored in the data storage unit 18. Then, the prediction value calculation unit 12 calculates, by using the model, a prediction value obtained by changing the parameter so as to bring the KPI closer to a value assumed to be optimal (a desired value) from the actual data of the parameter at the predetermined moment. At this time, for example, the prediction value calculation unit 12 calculates a tentative prediction value obtained by changing the parameter in consideration of the process of change of the actual data of the parameter so far, and checks whether or not the KPI improves when the tentative prediction value is used. In a case where the KPI improves when the tentative prediction value is used, the prediction value calculation unit 12 employs the tentative prediction value as a first prediction value. As an example, the prediction value calculation unit 12 obtains a tentative prediction value from an immediately preceding slope of a graph showing the change of the parameter so far, and the prediction value calculation unit 12 sets the tentative prediction value as the first prediction value if the KPI improves, and changes the slope and changes the tentative prediction value if the KPI does not improve.

Figure 2:
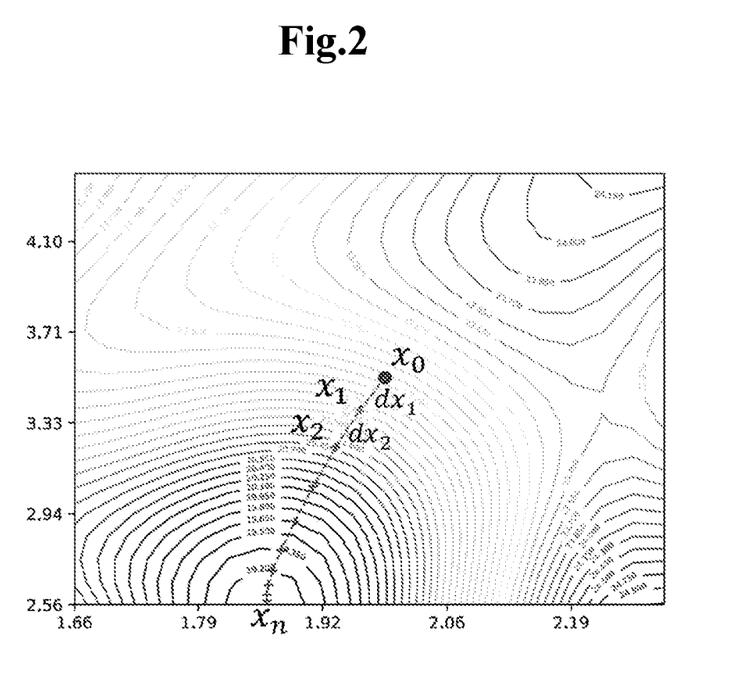
FIG. 2 is a view showing an example of calculation of a parameter optimization route by the information processing apparatus disclosed in FIG. 1.
Figure 3:
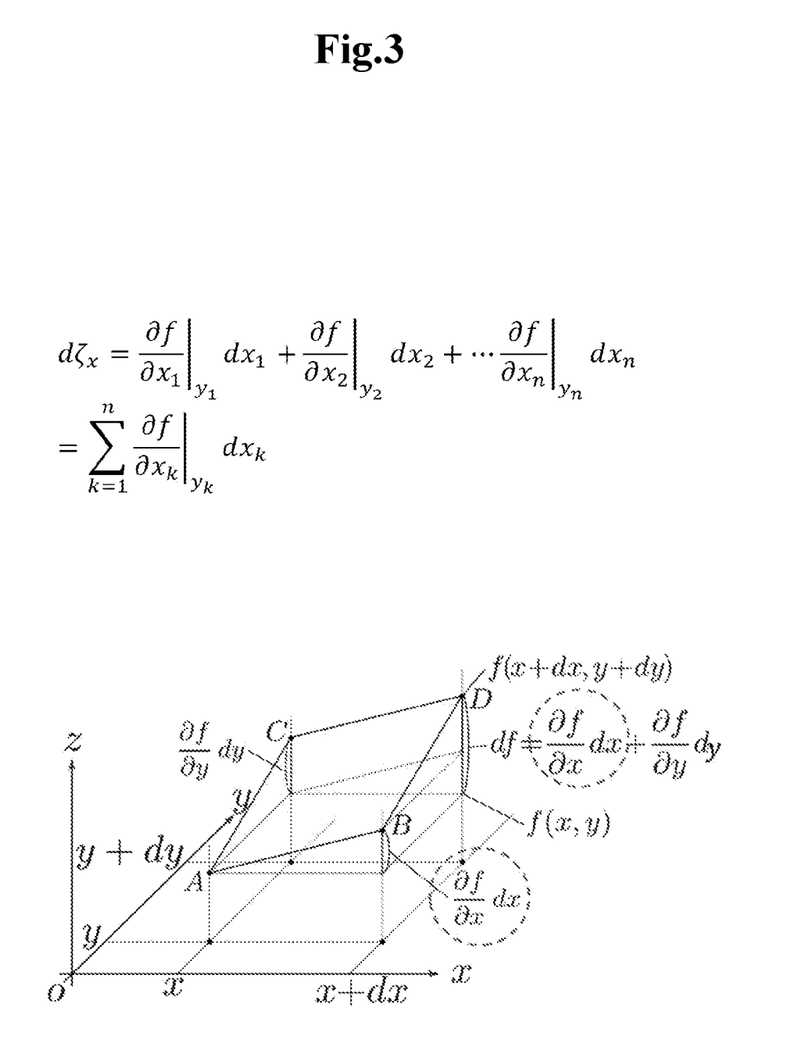
FIG. 3 is a view showing an example of calculation of the change quantity of a KPI with the change of a parameter by the information processing apparatus disclosed in FIG. 1.

The prediction value calculation unit 12 calculates the first prediction value of the parameter as described above, and thereafter, obtains a second prediction value that is the next prediction value by using the first prediction value in the same manner as described above. The prediction value calculation unit 12 thus obtains a plurality of prediction values of the parameter until the KPI becomes a value assumed to be optimal. Then, the prediction value calculation unit 12 calculates continuous values that are the plurality of prediction values connected by a diagram as an optimization route representing a route of change of the parameter to the optimal value. Here, an example of the optimization route of the parameter x is shown in FIG. 2. In this figure, x_0 indicates the actual data of the parameter x, and x_1, x_2, and x_n indicate the calculated prediction values. Although not shown, other prediction values are also calculated and, to be specific, x_n is a prediction value that is assumed to be the optimal value of the parameter x. In this case, the prediction value calculation unit 12 calculates a diagram connecting the calculated prediction values of the parameter x and thereby calculates as an optimization route from the actual data of the parameter x. Symbols dx_1 and dx_2 shown in FIG. 2 each indicate a change quantity between the prediction values of the parameter x.

However, the prediction value calculation unit 12 may calculate a prediction value of the parameter and an optimization route by any method. For example, the prediction value calculation unit 12 may predict an optimal value from actual data of the parameter by any method by using the model and calculate the process of change thereof as an optimization route of the parameter. Alternatively, the prediction value calculation unit 12 may calculate one or a plurality of prediction values of the parameter without calculating the process of change of the parameter to an optimal value.

The change quantity calculation unit 13 calculates, for each parameter, the quantity of change of the KPI due to change of a prediction value by using the model and the prediction values of the parameter calculated as described above. To be specific, as shown by an equation in the upper part of FIG. 3, the change quantity calculation unit 13 partially differentiates the model with respect to a certain parameter x, obtains the change quantity of the KPI corresponding to each of the plurality of prediction values $x\_1$, $x\_2, \ldots, x\_n$ of the parameter x, and calculates a value obtained by integrating the change quantities as a score representing the integrated change quantity of the KPI. At this time, the change quantity calculation unit 13 also calculates the absolute value of the score. The plurality of prediction values of the parameter x are values on the optimization route of the parameter x calculated as described above. Therefore, as shown by a view in the lower part of FIG. 3, the score of the KPI calculated with respect to the parameter x is the integrated value of the change quantities of the KPI due to slight changes of the prediction value of the parameter x, and it can be said that the score represents the degree of influence of the parameter x on the KPI.

Then, the change quantity calculation unit 13, for each parameter, calculates the score by integrating the change quantities of the KPI due to change of the prediction value in the same manner as described above, and also calculates the absolute value of the score. Although the change quantity calculation unit 13 partially differentiates the model with a certain parameter and calculates a score that is the change quantity of the KPI due to change of the parameter in the above description, the change quantity calculation unit 13 may calculate the change quantity of the KPI by another method. That is to say, the change quantity calculation unit 13 may obtain the change quantity of the KPI without using partial derivative of the model as described above. Moreover, although the change quantity calculation unit 13 calculates the integrated value of the change quantities of the KPI due to change of the prediction value as the score in the above description, the change quantity calculation unit 13 may calculate, as the score, a value obtained by a predetermined operation such as averaging the change quantities of the KPI due to change of the prediction value.

The evaluation unit 14 evaluates the score calculated for each parameter as described above. For example, the evaluation unit 14 ranks the absolute values of the scores in order to evaluate the magnitude of the value of each score, that is, the degree of influence on the KPI for each parameter. As an example, as shown in FIG. 4, the evaluation unit 14 arranges the scores of the respective parameters in descending order. At this time, since the score is the absolute value of the integrated value of change quantities of the KPI due to the change of the prediction value of each parameter, it can be said that the degree of influence on the KPI is greater as the value of the parameter is larger. The evaluation unit 14 may output a display in which the scores are arranged as shown in FIG. 4 from a predetermined display device.

Then, the evaluation unit 14 selects a parameter to be changed and set for optimization of the KPI based on the ranking of the absolute values of the scores. For example, the evaluation unit 14 selects a parameter whose score absolute value exceeds a preset threshold value or a predetermined number of parameters with the larger score absolute values. In a case where the number of the selected parameters is more than a preset upper limit number, the evaluation unit 14 determines to perform reselection because it is difficult to actually change and set the parameters.

The evaluation unit 14 also ranks negative scores whose values are negative among the abovementioned scores. As an example, as shown in FIG. 5, the evaluation unit 14 displays the negative scores of the respective parameters in descending order in the negative direction. At this time, a parameter with a large score value in the negative direction has a great negative influence on the KIP, but it is considered to be highly probable that the correlation between the parameters is strong. Therefore, the evaluation unit 14 determines to take measures such as reconstructing the model in a case where a negative score whose value is equal to or more than a threshold value in the negative direction exists.

The optimization unit 15 (a calculation unit) calculates an optimal value that can optimize the KPI with respect to a parameter selected by the evaluation unit 14. For example, the optimization unit 15, by using the model, changes the values of some or all of the selected parameters to calculate the KPI, and calculates the optimal values of the respective parameters that optimize the KPI.

Then, the optimization unit 15 evaluates the KPI when the calculated optimal values of the parameters are applied. For example, the optimization unit 15 checks whether or not the KPI when the optimal values of the respective parameters are applied improves so as to be equal to or more than a preset threshold value.

In a case where the KPI when the optimal values of the respective parameters are applied improves so as to be equal to or more than the preset threshold value, the setting unit 16 sets the optimal values of the respective parameters in the monitoring target 20 that is an actual plant. Setting of the optimal values of the respective parameters in the plant may be manually performed by an operator.

[Operation]

Next, an operation of information processing apparatus 10 described above will be described with reference to a flowchart of FIG. 6. First, the information processing apparatus 10 retrieves the model and the plant data (step S1). Then, the information processing apparatus 10 uses the model to calculate, for each parameter, a prediction value of the parameter changed so as to bring the KPI to a value considered to be optimal from the actual data of the parameter at a predetermined moment (step S2). To be specific, the information processing apparatus 10 calculates an optimization route representing a change route to the optimal value of the parameter and calculates a plurality of prediction values on the optimization route.

Subsequently, the information processing apparatus 10 calculates, for each parameter, the change quantity of the KPI due to change of the prediction value of the parameter. At this time, the information processing apparatus 10, for each parameter, calculates the integrated value of partial differential values of the model with change of the parameter to the respective prediction values, and calculates the integrated value as the score (step S3).

Subsequently, the information processing apparatus 10 ranks the absolute values of the scores calculated for the respective parameters (step S4). For example, as shown in FIG. 4, the information processing apparatus 10 arranges the absolute values of the scores of the respective parameters in decreasing order. The information processing apparatus 10 also ranks the scores having negative values among the scores of the respective parameters. For example, as shown in FIG. 5, the information processing apparatus 10 arranges the negative scores of the respective parameters in increasing order, that is, in decreasing order in the negative direction. Then, the information processing apparatus 10 checks whether or not the parameter has a great negative influence on the KPI because the value of the negative score is large in the negative direction. At this time, in a case where there is a parameter which has a great negative influence (NO at step S5), it is highly probable that the correlation between the parameters is strong, and therefore, the information processing apparatus 10 takes measures such as reconstructing the model. For example, the information processing apparatus 10 compresses the dimensions by using principal component analysis to reconstruct the model.

On the other hand, in a case where, as a result of ranking the negative scores, none of the negative scores are more than a threshold value in the negative direction and the information processing apparatus 10 can determine that the negative influences of all the parameters are small enough (YES at step S5), the information processing apparatus 10 selects a parameter from the ranking of the absolute values of the scores described above. At this time, the information processing apparatus 10 checks the number of parameters whose score absolute values exceed the threshold value and, in a case where the number does not exceed an upper limit value, selects the parameters (YES at step S6). Since it can be said that the influence on the KPI of the parameter is greater as the score absolute value of the parameter is lager, the information processing apparatus 10 selects such a parameter having a large value as a parameter to be changed and set for the optimization of the KPI. On the other hand, in a case where the number of parameters whose score absolute values exceed the threshold value exceeds the upper limit value (NO at step S6), it is difficult to actually change and set the parameters, and therefore, the information processing apparatus 10 reselects parameters by limiting parameters to be changed in advance or changing a method for calculating prediction values of parameters, for example.

Subsequently, the information processing apparatus 10 calculates optimal values that can optimize the KPI with respect to the selected parameters (step S7). Then, the information processing apparatus 10 checks whether or not the KPI when the calculated optimal values of the parameters are applied improves to be equal to or more than a preset threshold value (step S8). In a case where the KPI when the optimal values of the respective parameters are applied improves to be equal to or more than the preset threshold value (YES at step S8), the information processing apparatus 10 sets the optimal values of the respective parameters in the monitoring target 20 that is an actual plant (step S9). On the other hand, in a case where the KPI does not improve (NO at step S8), the information processing apparatus 10 reselects parameters or reconstructs the model as with the above.

As described above, according to the present invention, for each parameter, an optimization route of the parameter is first calculated using the model. Then, for each parameter, the change quantity of the KPI with change of the parameter is calculated using a prediction value along the optimum route of the parameter. Thus, by checking the change quantity of the KPI for each parameter, it is possible to check the degree of influence of the parameter on the KPI and, even when there are a number of parameters used for the model, it is possible to select parameter which are appropriate for optimization of the KPI. As a result, it is possible to easily optimize the state of a target such as the KPI.

Second Example Embodiment

Figure 7:
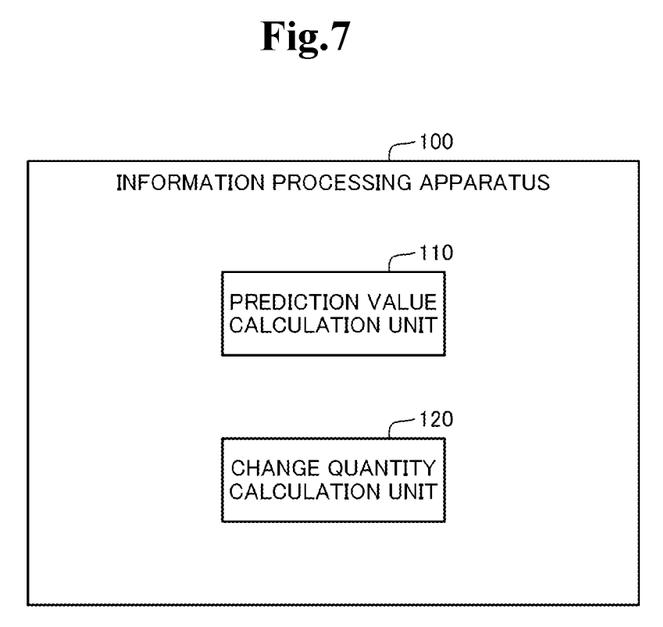
FIG. 7 is a block diagram showing a configuration of an information processing apparatus in a second example embodiment of the present invention.

Next, a second example embodiment of the present invention will be described with reference to FIG. 7. FIG. 7 is a block diagram showing a configuration of an information processing apparatus in the second example embodiment. In this example embodiment, the overview of the configuration of the information processing apparatus described in the first example embodiment is illustrated.

As shown in FIG. 7, an information processing apparatus 100 in this example embodiment includes: a prediction value calculation unit 110 configured to calculate, based on a model calculating an objective variable representing a state of a target by using a plurality of explanatory variables, for each of the explanatory variables, a prediction value of the explanatory variable that changes based on a value of the explanatory variable at a predetermined moment; and a change quantity calculation unit 120 configured to calculate, for each of the explanatory variables, a change quantity of the objective variable due to change of the explanatory variable by using the prediction value of the explanatory variable and the model.

The prediction value calculation unit 110 and the change quantity calculation unit 120 described above may be structured by execution of a program by an arithmetic logic unit included by the information processing apparatus 100, or may be structured by an electronic circuit.

Then, the information processing apparatus 100 with the above configuration operates to execute processing including: based on a model calculating an objective variable representing a state of a target by using a plurality of explanatory variables, calculating, for each of the explanatory variables, a prediction value of the explanatory variable that changes based on a value at a predetermined moment of the explanatory variable; and calculating, for each of the explanatory variables, a change quantity of the objective variable due to change of the explanatory variable by using the prediction value of the explanatory variable and the model.

According to the invention, for each explanatory variable, the prediction value of the explanatory variable is calculated and the change quantity of an objective variable representing the state of a target due to change of the prediction value is calculated, so that it is possible to easily check the degree of influence of the explanatory variable on the objective variable. As a result, by selecting an influential explanatory variable and changing/setting, it is possible to optimize the state of a target that is the objective variable.

Supplementary Notes

The whole or part of the example embodiments disclosed above can be described as the following supplementary notes. The overview of the configurations of the information processing apparatus, the information processing method, and the program according to the present invention will be described below. However, the present invention is not limited to the following configurations.

Supplementary Note 1

An information processing apparatus comprising:
a prediction value calculation unit configured to calculate, based on a model calculating an objective variable representing a state of a target by using a plurality of explanatory variables, for each of the explanatory variables, a prediction value of the explanatory variable that changes based on a value of the explanatory variable at a predetermined moment; and
a change quantity calculation unit configured to calculate, for each of the explanatory variables, a quantity of change of the objective variable with change of the explanatory variable by using the prediction value of the explanatory variable and the model.

Supplementary Note 2

The information processing apparatus according to Supplementary Note 1, wherein:
the prediction value calculation unit is configured to calculate, for each of the explanatory variables, a plurality of prediction values of the explanatory variable that make the objective variable close to a desired value; and
the change quantity calculation unit is configured to calculate, for each of the explanatory variables, a quantity of change of the objective variable with change between the plurality of prediction values of the explanatory variable by using the plurality of prediction values of the explanatory variable and the model.

Supplementary Note 3

The information processing apparatus according to Supplementary Note 2, wherein the prediction value calculation unit is configured to, for each of the explanatory variables, calculate a change route including continuous values of the prediction values of the explanatory variable that make the objective variable close to a desired value, and calculate a plurality of prediction values of the explanatory variable on the change route.

Supplementary Note 4

The information processing apparatus according to Supplementary Note 2 or 3, wherein the change quantity calculation unit is configured to, for each of the explanatory variables, aggregate quantities of change of the objective variable with respective changes between the plurality of prediction values of the explanatory variable by a predetermined operation, and consider a value obtained by aggregation as a quantity of change of the objective variable.

Supplementary Note 5

The information processing apparatus according to Supplementary Note 4, wherein the change quantity calculation unit is configured to, for each of the explanatory variables, integrate quantities of change of the objective variable with respective changes between the plurality of prediction values of the explanatory variable, and consider a value obtained by integration as a quantity of change of the objective variable.

Supplementary Note 6

The information processing apparatus according to any of claims 1 to 5, wherein the change quantity calculation unit is configured to calculate, for each of the explanatory variables, a quantity of change of the objective variable by using a partial differential of the model with the explanatory variable.

Supplementary Note 7

The information processing apparatus according to any of Supplementary Notes 1 to 6, comprising an evaluation unit configured to, based on a value of a quantity of change of the objective variable calculated for each of the explanatory variables, evaluate the explanatory variable.

Supplementary Note 8

The information processing apparatus according to Supplementary Note 7, wherein the evaluation unit is configured to, based on a value of a quantity of change of the objective variable calculated for each of the explanatory variables, select the explanatory variable.

Supplementary Note 9

The information processing apparatus according to Supplementary Note 8, wherein the evaluation unit is configured to select a predetermined number of explanatory variables that absolute values of quantities of change of the objective variable calculated for the respective explanatory variables are large.

Supplementary Note 10

The information processing apparatus according to Supplementary Note 8 or 9, comprising a calculation unit configured to calculate a set value of the selected explanatory variable, and calculate a value of the objective variable by using the set value of the explanatory variable and the model.

Supplementary Note 11

A computer program comprising instructions for causing an information processing apparatus to realize:
a prediction value calculation unit configured to calculate, based on a model calculating an objective variable representing a state of a target by using a plurality of explanatory variables, for each of the explanatory variables, a prediction value of the explanatory variable that changes based on a value of the explanatory variable at a predetermined moment; and
a change quantity calculation unit configured to calculate, for each of the explanatory variables, a quantity of change of the objective variable with change of the explanatory variable by using the prediction value of the explanatory variable and the model.

Supplementary Note 12

An information processing method comprising:
calculating, based on a model calculating an objective variable representing a state of a target by using a plurality of explanatory variables, for each of the explanatory variables, a prediction value of the explanatory variable that changes based on a value of the explanatory variable at a predetermined moment; and
calculating, for each of the explanatory variables, a quantity of change of the objective variable with change of the explanatory variable by using the prediction value of the explanatory variable and the model.

Supplementary Note 12.1

The information processing method according to Supplementary Note 12, comprising:

calculating, for each of the explanatory variables, a plurality of prediction values of the explanatory variable that make the objective variable close to a desired value; and calculating, for each of the explanatory variables, a quantity of change of the objective variable with change between the plurality of prediction values of the explanatory variable by using the plurality of prediction values of the explanatory variable and the model.

Supplementary Note 12.2

The information processing method according to Supplementary Note 12.1, comprising, for each of the explanatory variables, calculating a change route including continuous values of the prediction values of the explanatory variable that make the objective variable close to a desired value, and calculating a plurality of prediction values of the explanatory variable on the change route.

Supplementary Note 12.3

The information processing method according to Supplementary Note 12.1 or 12.2, comprising, for each of the explanatory variables, aggregating quantities of change of the objective variable with respective changes between the plurality of prediction values of the explanatory variable by a predetermined operation, and considering a value obtained by aggregation as a quantity of change of the objective variable.

Supplementary Note 12.4

The information processing method according to Supplementary Note 12.3, comprising, for each of the explanatory variables, integrating quantities of change of the objective variable with respective changes between the plurality of prediction values of the explanatory variable, and considering a value obtained by integration as a quantity of change of the objective variable.

Supplementary Note 12.5

The information processing method according to any of Supplementary Notes 12 to 12.4, comprising calculating, for each of the explanatory variables, a quantity of change of the objective variable by using a partial differential of the model with the explanatory variable.

Supplementary Note 12.6

The information processing method according to any of Supplementary Notes 12 to 12.5, comprising, based on a value of a quantity of change of the objective variable calculated for each of the explanatory variables, evaluating the explanatory variable.

Supplementary Note 12.7

The information processing method according to Supplementary Note 12.6, comprising, when evaluating the explanatory variable, based on a value of a quantity of change of the objective variable calculated for each of the explanatory variables, selecting the explanatory variable.

Supplementary Note 12.8

The information processing method according to Supplementary Note 12.7, comprising selecting a predetermined number of explanatory variables that absolute values of quantities of change of the objective variable calculated for the respective explanatory variables are large.

Supplementary Note 12.9

The information processing method according to Supplementary Note 12.7 or 12.8, comprising calculating a set value of the selected explanatory variable, and calculating a value of the objective variable by using the set value of the explanatory variable and the model.

The program described above can be stored by using various types of non-transitory computer-readable mediums and supplied to a computer. The non-transitory computer-readable mediums include various types of tangible storage mediums. Examples of the non-transitory computer-readable mediums include a magnetic recording medium (for example, a flexible disk, a magnetic tape, a hard disk drive), a magnetooptical recording medium (for example, a magnetooptical disk), a CD-ROM (Read Only Memory), a CD-R, a CD-R/W, and a semiconductor memory (for example, a mask ROM, a PROM (Programmable ROM), an EPROM (Erasable PROM), a flash ROM, a RAM (Random Access Memory). The program may be supplied to a computer by various types of transitory computer-readable mediums. Examples of the transitory computer-readable mediums include electric signals, optical signals, and electromagnetic waves. The transitory computer-readable medium can supply the program to a computer via a wired communication channel such as an electric wire or an optical fiber or via a wireless communication channel.

Although the present invention has been described above with reference to the example embodiments, the present invention is not limited to the example embodiments. The configurations and details of the present invention can be changed in various manners that can be understood by one skilled in the art within the scope of the present invention.

DESCRIPTION OF NUMERALS 10 information processing apparatus
11 data measurement unit
12 prediction value calculation unit
13 change quantity calculation unit
14 evaluation unit
15 optimization unit
16 setting unit
18 data storage unit
19 model storage unit
100 information processing apparatus
110 prediction value calculation unit
120 change quantity calculation unit

The invention claimed is:

1. An information processing apparatus comprising:
 a memory storing instructions; and
 at least one processor configured to execute the instructions to perform processing comprising:
  retrieving a model for determining values of parameters of a manufacturing facility so that a state of the manufacturing facility becomes optimal, wherein the state of the manufacturing facility as an objective variable of the model, and wherein the parameters of the manufacturing facility are explanatory variables of the model;
  retrieving current values of the parameters of the manufacturing facility, from sensors that measure the current values;

for each parameter, calculating a change route of the parameter by which the value of the parameter should be changed over time starting from the current value of the parameter to reach an optimal value of the parameter at which the state of the manufacturing facility becomes optimal, using the model;

for each parameter, calculating a quantity of change of the state of the manufacturing facility due to change of the value of the parameter along the change route, using the model;

for each parameter, calculating a score as an integrated value of a partial derivative of the quantity of change of the state of the manufacturing facility due to change of the value of the parameter along the change route;

ranking the parameters of the manufacturing facility by absolute values of the calculated scores;

selecting the parameters for which the calculated scores are negative;

determining whether an influence of the selected parameters on the state of the manufacturing facility is smaller than a first threshold;

when the influence of the selected parameters on the state of the manufacturing facility is smaller than first threshold, determining optimal values of the selected parameters, as the values of the selected parameters after the current values of the selected parameters along the change route;

determining whether an improvement in the state of the manufacturing facility that would occur by setting the selected parameters to the optimal values is greater than a second threshold; and when the improvement in the state of the manufacturing facility that would occur is greater than the second threshold, setting the selected parameters of the manufacturing facility to the optimal values.

2. The information processing apparatus according to claim 1, wherein the processing further comprises i, for each of the explanatory variables, aggregating quantities of change of the objective variable with respective changes by a predetermined operation, and considering a value obtained by aggregation as a quantity of change of the objective variable.

3. The information processing apparatus according to claim 2, wherein the processing further comprises, for each of the explanatory variables, integrating the quantities of change of the objective variable with the respective changes, and considering a value obtained by integration as the quantity of change of the objective variable.

4. The information processing apparatus according to claim 1, wherein the processing further comprises calculating, for each of the explanatory variables, a quantity of change of the objective variable by using a partial differential of the model with the explanatory variable.

5. The information processing apparatus according to claim 1, wherein the processing further comprises, based on a value of a quantity of change of the objective variable calculated for each of the explanatory variables, evaluating the explanatory variable.

6. The information processing apparatus according to claim 5, wherein the processing further comprises, based on a value of a quantity of change of the objective variable calculated for each of the explanatory variables, selecting the explanatory variable.

7. The information processing apparatus according to claim 6, wherein the processing further comprises selecting a predetermined number of the explanatory variables that for which absolute values of quantities of change of the objective variable are large.

8. The information processing apparatus according to claim 6, wherein the processing further comprises calculating a set value of the selected explanatory variable, and calculating a value of the objective variable by using the set value of the explanatory variable and the model.

9. A non-transitory computer-readable storage medium storing a computer program executable by an information processing apparatus to perform processing comprising:

retrieving a model for determining values of parameters of a manufacturing facility so that a state of the manufacturing facility becomes optimal, wherein the state of the manufacturing facility as an objective variable of the model, and wherein the parameters of the manufacturing facility are explanatory variables of the model;

retrieving current values of the parameters of the manufacturing facility, from sensors that measure the current values;

for each parameter, calculating a change route of the parameter by which the value of the parameter should be changed over time starting from the current value of the parameter to reach an optimal value of the parameter at which the state of the manufacturing facility becomes optimal, using the model;

for each parameter, calculating a quantity of change of the state of the manufacturing facility due to change of the value of the parameter along the change route, using the model;

for each parameter, calculating a score as an integrated value of a partial derivative of the quantity of change of the state of the manufacturing facility due to change of the value of the parameter along the change route;

ranking the parameters of the manufacturing facility by absolute values of the calculated scores;

selecting the parameters for which the calculated scores are negative;

determining whether an influence of the selected parameters on the state of the manufacturing facility is smaller than a first threshold;

when the influence of the selected parameters on the state of the manufacturing facility is smaller than first threshold, determining optimal values of the selected parameters, as the values of the selected parameters after the current values of the selected parameters along the change route;

determining whether an improvement in the state of the manufacturing facility that would occur by setting the selected parameters to the optimal values is greater than a second threshold; and when the improvement in the state of the manufacturing facility that would occur is greater than the second threshold, setting the selected parameters of the manufacturing facility to the optimal values.

10. An information processing method performed by a computer and comprising:

retrieving a model for determining values of parameters of a manufacturing facility so that a state of the manufacturing facility becomes optimal, wherein the state of the manufacturing facility as an objective variable of the model, and wherein the parameters of the manufacturing facility are explanatory variables of the model;

retrieving current values of the parameters of the manufacturing facility, from sensors that measure the current values;

for each parameter, calculating a change route of the parameter by which the value of the parameter should be changed over time starting from the current value of the parameter to reach an optimal value of the parameter at which the state of the manufacturing facility becomes optimal, using the model;

for each parameter, calculating a quantity of change of the state of the manufacturing facility due to change of the value of the parameter along the change route, using the model;

for each parameter, calculating a score as an integrated value of a partial derivative of the quantity of change of the state of the manufacturing facility due to change of the value of the parameter along the change route;

ranking the parameters of the manufacturing facility by absolute values of the calculated scores;

selecting the parameters for which the calculated scores are negative;

determining whether an influence of the selected parameters on the state of the manufacturing facility is smaller than a first threshold;

when the influence of the selected parameters on the state of the manufacturing facility is smaller than first threshold, determining optimal values of the selected parameters, as the values of the selected parameters after the current values of the selected parameters along the change route;

determining whether an improvement in the state of the manufacturing facility that would occur by setting the selected parameters to the optimal values is greater than a second threshold; and when the improvement in the state of the manufacturing facility that would occur is greater than the second threshold, setting the selected parameters of the manufacturing facility to the optimal values.

11. The information processing method according to claim 10, further comprising, for each of the explanatory variables, aggregating quantities of change of the objective variable with respective changes by a predetermined operation, and considering a value obtained by aggregation as a quantity of change of the objective variable.

12. The information processing method according to claim 11, further comprising, for each of the explanatory variables, integrating the quantities of change of the objective variable with the respective changes, and considering a value obtained by integration as the quantity of change of the objective variable.

13. The information processing method according to claim 10, further comprising calculating, for each of the explanatory variables, a quantity of change of the objective variable by using a partial differential of the model with the explanatory variable.

14. The information processing method according to claim 10, further comprising, based on a value of a quantity of change of the objective variable calculated for each of the explanatory variables, evaluating the explanatory variable.

15. The information processing method according to claim 14, further comprising, based on a value of a quantity of change of the objective variable calculated for each of the explanatory variables, selecting the explanatory variable.

16. The information processing method according to claim 14, further comprising calculating a set value of the selected explanatory variable, and calculating a value of the objective variable by using the set value of the explanatory variable and the model.

* * * * *